April 14, 1959     E. R. SEWELIN     2,882,090
MOTOR VEHICLE BODY MOUNTING MEANS
Filed March 13, 1957     2 Sheets-Sheet 1
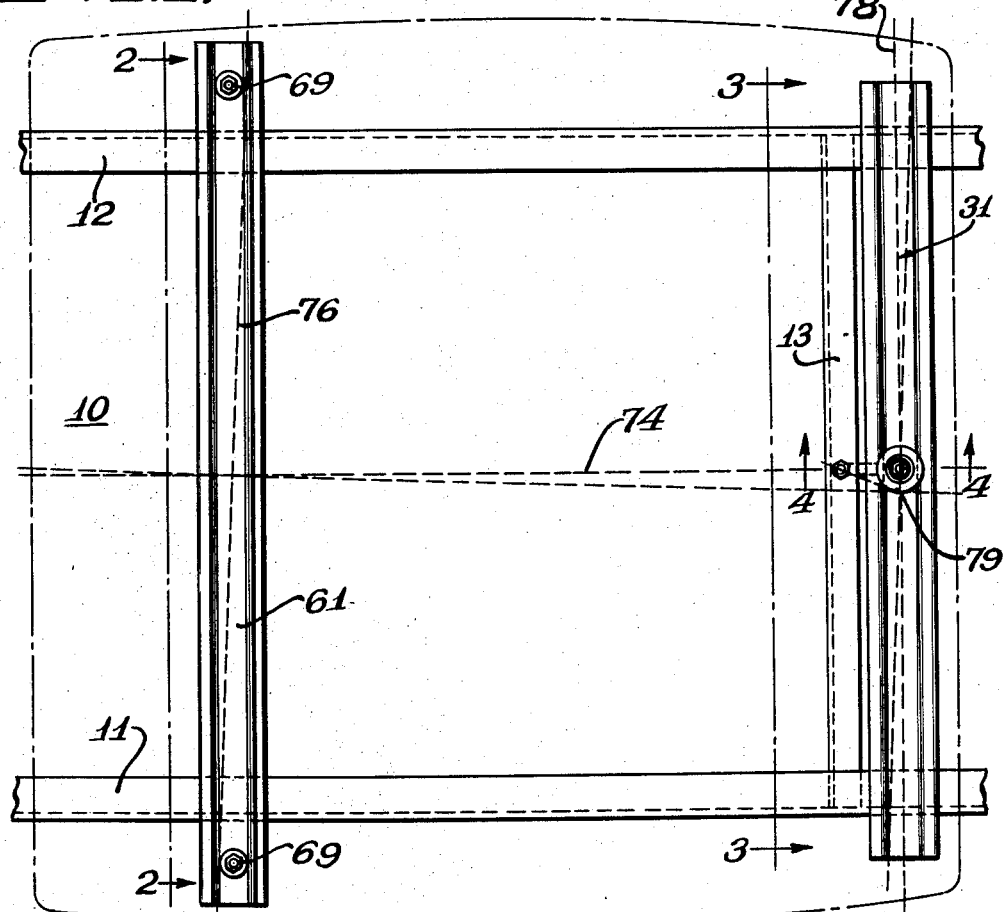
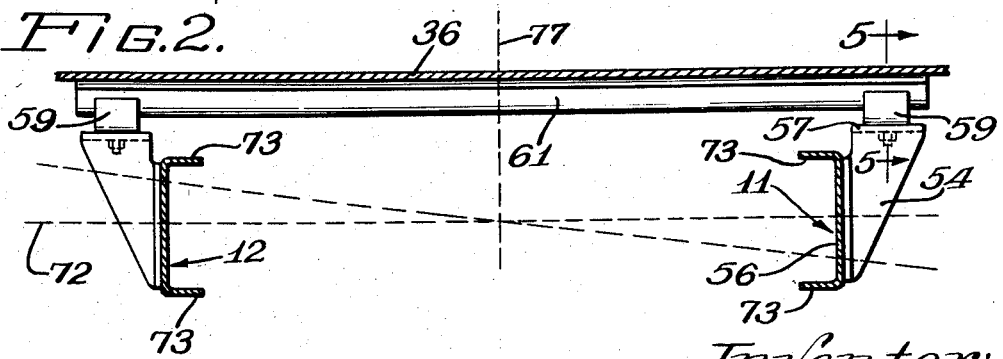
Inventor:
Ernest R. Sewelin
Atty.

April 14, 1959 E. R. SEWELIN 2,882,090
MOTOR VEHICLE BODY MOUNTING MEANS
Filed March 13, 1957 2 Sheets-Sheet 2
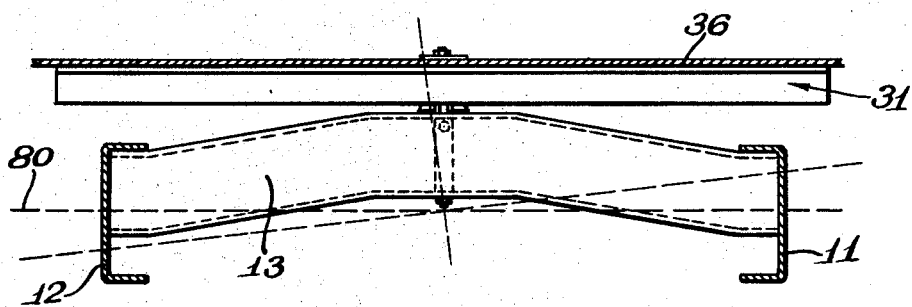
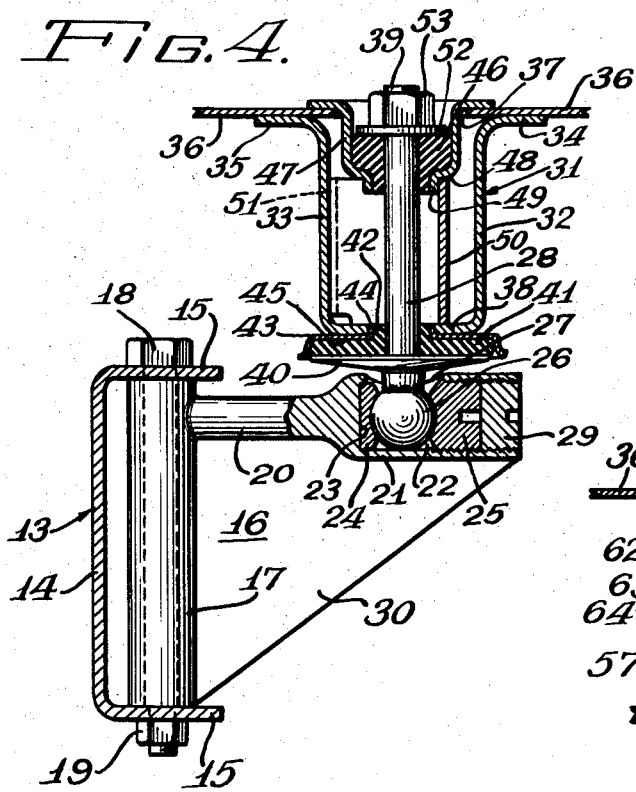
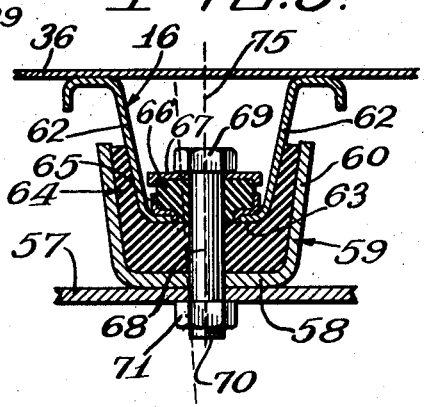
Inventor:
Ernest R. Sewelin

United States Patent Office 2,882,090
Patented Apr. 14, 1959

2,882,090

MOTOR VEHICLE BODY MOUNTING MEANS

Ernest R. Sewelin, Waterloo, Ind., assignor to International Harvester Company, Chicago, Ill., a corporation of New Jersey Application March 13, 1957, Serial No. 645,727

8 Claims. (Cl. 296—35)

This invention relates to a body mounting structure for automotive vehicles and more particularly to a new and improved vehicle cab mounting structure for trucks or the like which permits limited flexibility between the vehicle chassis frame and the cab.

In the operation of trucks or other vehicles designed for carrying heavy loads over an uneven terrain or road surface irregularities one or more ground engaging wheels are elevated differently from the other wheels causing the frame side sills to twist or weave. Hence it is customary in present-day truck design and construction to provide a chassis frame which is relatively flexible and capable of relieving the torsional forces imposed on the chassis frame by the distortion of the frame side sills. While the automotive engineers have effectively mitigated the damaging influence of these forces on the chassis frame by providing a flexible frame, the problem of mounting the vehicle cab on the flexible frame in such a manner so as to minimize the transfer of the destructive forces to the cab has not been entirely solved. It is, therefore, the primary objective of the present invention to provide a novel cab mounting structure which allows a limited relative movement between the cab and the chassis frame whereby the distorting forces and shocks to which the chassis frame is subjected are transmitted to a lesser degree to the cab than heretofore possible.

Another object is the provision of a novel mounting structure for vehicle cabs whereby the cab may rock laterally with respect to the chassis frame about an axis parallel to the longitudinal median line of the chassis frame as well as about an axis perpendicular to the longitudinal median line of the chassis frame.

A further object is to mount the rear portion of the cab for universal movement on the chassis frame.

A still further object is the provision of a vehicle cab mounted on a chassis frame in such a manner that it is not distorted and subsequently damaged when the chassis frame upon which it is mounted is subjected to periodic torsional forces.

The foregoing and other important objects and desirable features inherent in and encompassed by the invention, together with many of the purposes and uses thereof, will become readily apparent from a reading of the ensuing description in conjunction with the annexed drawings in which:

Figure 1 is a plan view of the front portion of a truck chassis frame incorporating the invention; the outline of the operator's compartment or cab is shown in broken lines;

Figure 2 is a sectional view taken substantially along line 2—2 of Figure 1;

Figure 3 is a sectional view taken substantially along line 3—3 of Figure 1;

Figure 4 is an enlarged sectional view taken substantially along line 4—4 of Figure 1; and Figure 5 is a detailed sectional view taken substantially along line 5—5 of Figure 2.

Referring to the drawings in detail wherein like reference characters represent like elements throughout the various views, there is shown the front portion of a truck chassis frame 10. The chassis frame 10 includes a pair of longitudinally extending, transversely spaced side sill member 11 and 12 having the conventional U-shape form interconnected by a plurality of longitudinally spaced, transversely disposed cross members 13 (only one of which is shown in Figures 1 and 3). The cross member 13 also has a U-shape form and the web portion 14 thereof is shown disposed substantially vertically with the spaced legs 15 extending longitudinally rearwardly. The legs 15 of the cross member 13 are provided with vertically aligned apertures, which apertures are spaced substantially mid-way between the transverse ends of the cross member 13. Reference character 16 designates an L-shaped bracket, one leg 17 of which is cylindrical and has a length substantially equal to the vertical spacing between the legs 15 of the cross member 13. The leg 17 is positioned between the legs 15 and is provided with a central bore which is placed in registration with the apertures formed in the legs 15 of the cross member 13. A bolt 18 extends through the aligned apertures and central bore of the leg 17 and is secured to the cross member 13 by means of a locknut 19. The bolt 18 serves as a pivot pin whereby the bracket 16 is capable of pivoting horizontally about a vertical axis containing the longitudinal axis of the bolt 18. One end of the other leg 20 of the bracket 16 is rigidly fastened adjacent the upper end of the leg 17, as viewed in Figure 4, and extends horizontally therefrom. The free end of the leg 20 is provided with an enlarged hollow portion 21. The central cylindrical bore 22 of the enlarged portion 21 is closed at one end by a flat wall surface 23. A pair of bearing block elements 24 and 25 are positioned within the cylindrical bore 22 and the bearing block element 24 abuts the wall surface 23. The bearing block elements 24 and 25 are provided with concave faces conforming to the spherical contour of a ball 27. The normally upper side wall of the enlarged portion 21 is provided with an enlarged opening 27 through which a shank 28 integrally formed with the ball 26 extends. The outer end of the cylindrical bore 22 is provided with internal threading and the bearing block element 25 is provided with mating external threading, whereby the bearing block may be adjusted toward and away from the bearing block element 24 to vary the fit between the spherical contour of the ball 26 and the concave faces of the bearing block elements 24 and 25. In use, the bearing block element 25 is adjusted such that the shank 28 is permitted to freely swivel with respect to the bracket 16 but is snugly retained within the socket formed by the bearing block elements 24 and 25 without any undue friction between the inner engaging surfaces thereof. A suitable grease fitting, not shown, may be mounted on the bracket 16 for supplying lubricating grease to the ball and socket joint. The outer end of the cylindrical bore 22 is closed by a cap or plug 29 which is threaded into the cylindrical bore, which cap or plug also serves to maintain the adjusted relationship of the bearing block elements 24 and 25. In order to strengthen and reinforce the bracket 16 a triangular plate-like web 30 is welded to the legs 17 and 20, as shown in Figure 4.

The outline of the sheet metal portion of the vehicle cab is shown in broken lines in Figure 1. The vehicle cab includes a transversely extending inverted U-shaped rear cab cross member 31, the legs 32 and 33 of which are provided with horizontal oppositely projecting flanges 34, 35, respectively, for attachment to the floor panel 36. The floor panel 36 is provided with an enlarged circular opening 37 substantially mid-way between the transverse sides of the vehicle cab and in vertical alignment with the web 38 of the cab cross member 31. The end 39 of the shank 28 opposite the ball 26 extends through the opening 37 and is provided with external threading. The shank 28 also extends through a recess formed in the web 38, which recess has a diameter considerably larger than the diameter of the shank 28. As best shown in Figure 4, a radially extending circular abutment plate 40 is rigidly fastened to the shank 28 adjacent the ball end thereof. Encircling the shank 28 and abutting the plate 40 is an annular bushing 41 of rubber or rubber-like material. An annular projection 42 integrally formed with the main body of the rubber bushing 41 is disposed within the enlarged recess formed in the web 38. An inverted cup-shaped bushing retainer 43 also encircles the shank 28 and is adapted to abut the side of the rubber bushing 41 opposite the abutment plate 40. The retainer 43 is provided with an annular flange 44 which is interposed between the projection 42 and the surface of the web 38 defining the recess therein. The downwardly facing surface 45 of the web 38 abuts the retainer 43, as best shown in Figure 4. From the foregoing it will be appreciated that a portion of the weight of the cab is transmitted from the rear cross member 31 to the abutment plate 40 through the intermediary of the bushing 41 and metal to metal contact between such parts is eliminated. The connection between the vehicle cab and the bracket 16 described above effectively cushions shocks and vibrations between the chassis frame 10 and the vehicle cab, which shocks and vibrations produce relative movement between the parts causing the same to approach each other. In order to mitigate the damaging effect of the shocks and vibrations to the vehicle cab when such shocks and vibrations tend to cause the rear portion of the vehicle cab to separate from the chassis frame 10, a second bushing 46 of rubber or like deformable resilient material is employed. The bushing 46 encircles the shank 28 at its normally upper end and is seated in a cup-shaped retainer 47. The retainer 47 is provided with a radially extending flange which overlaps the floor panel 36 encircling the opening 37. The annular bottom wall 48 of the retainer 47 lies in a substantially horizontal plane. Integrally formed with and extending substantially perpendicular from the bottom wall 48 is an annular flange 49. Positioned between the web 38 of the rear cab cross member 31 and the retainer 47 is a U-shaped spacer 50. A portion of the upper marginal edge of the spacer 50 abuts sections of the projection 49 and the annular wall 48. The annular bottom wall 48 of the retainer 47 lies in a substantially horizontal plane. Integrally formed with and extending substantially perpendicular from the bottom wall 48 is an annular flange 49. Positioned between the web 38 of the rear cab cross member 31 and the retainer 47 is a U-shaped spacer 50. A portion of the upper marginal edge of the spacer 50 abuts sections of the projection 49 and the annular wall 48 of the retainer 47 and the lower marginal edge bears against the web 38. The ends of the legs of the U-shaped spacer 50 are provided with oppositely projecting flanges 51 (one of which is shown in Figure 4) which are suitably secured as by welding to the leg 33 of the rear cab cross member 31. Mounted on the shank 28 is a compression washer 52 which engages the rubber bushing 46 on the side thereof opposite the wall 48. A retaining nut 53 is engageable with the threaded end of the shank 28 to clamp the upper retainer 47 to the spacer 50 and the web 38 to the abutment plate 40. The operation of the connection between the rear portion of the vehicle cab to the chassis frame will be described hereinafter.

The forward portion of the vehicle cab is connected to the chassis frame at two points which are transversely spaced and in transverse alignment and are also longitudinally spaced from the rear cab connection described hereinbefore. In view of the fact that both front connecting structures are structurally and functionally the same, only the structure on one side of the chassis frame 10 will be described in detail. The connecting structure positioned along side sill member 11 includes a bracket 54 which extends outwardly and upwardly from the web 56 of the side sill member 11 to which it is rigidly fastened. A bracket 54 is provided with a flange 57 disposed in a horizontal plane vertically spaced above the side sill member 11, as best shown in Figure 2. The bight portion 58 of a U-shaped element 59 is adapted to be supported upon the flange 57. The legs 60 of the U-shaped element 59 are integrally formed with the bight portion 58 and extend upwardly and divergently therefrom. A front cab cross member 61 substantially parallel to and longitudinally spaced from the rear cab cross member 31 is rigidly fastened to the underside of the floor panel 36. The legs 62 as best shown in Figure 5 extend downwardly from the floor panel 36 and converge slightly. The web 63 of the front cab cross member is integrally formed with the lowermost ends of the legs 62 and lies in a substantially horizontal plane. As best shown in Figure 5, a portion of the front cab cross member section in vertical alignment with the element 59 projects downwardly between the legs 60 of the element 59. A rubber or rubber-like insulator 64 is interposed between the element 59 and the portion of the front cab cross member 61 extending into the element 59 which insulator 64 prevents metal to metal contact between the mating parts. The section of the web 63 disposed within the element 59 is provided with a central circular aperture. A cup-shaped bushing retainer 65 seats upon the uppermost surface of the web 63 and is provided with a downwardly projecting annular flange which engages the surface of the web 63 defining the recess. A rubber or rubber-like bushing 66 is seated upon the retainer 65. A compression washer 67 engages the uppermost surface of the bushing 66. The compression washer 67, bushing 66, insulator 64, web 58, and bracket portion 57 are provided with vertically aligned openings which are in alignment with the recess formed in the web 63 of the front cross member 61. A bolt 68 extends through the aligned aperture and openings and has an enlarged head 69 adapted to abut the compression washer 67 and a threaded end portion 70 disposed below the lowermost surface of the bracket portion 57. A retaining nut 71 is engageable with the threaded portion 70 of the bolt 68 to maintain the vehicle cab front connection structure described above in its assembled relationship. From the foregoing it will be appreciated that limited vertical movement of the cab front cross member 61 toward the bracket portion 57 is permitted but such vertical movement is yieldably resisted by the deformable rubber insulator 64. In a like manner the rubber bushing 66 cushions vertical movement of the front cab cross member 51 away from the side sill member 11. From the foregoing it will be appreciated that vertical movement of the vehicle cab with respect to the chassis frame 10 is effectively cushioned at each of the three points of connection of the vehicle cab to the chassis frame.

In normal operation of the truck over a comparatively smooth road bed the chassis frame twist is practically non-existent. The entire weight of the cab is supported by the bracket member 16 at the rear through the intermediary of the rubber cushioning pad 27 and at the forward end by the brackets 54 through the intermediary of the insulators 64. Movement of the cab vertically away from the chassis frame 10 is yieldably resisted by the insulator 46 at the rear of the cab and by the insulator 66 at the forward end of the cab. The cab is maintained in a relatively fixed upright position with respect to the chassis frame 10 by the three connection structures. Twisting of the chassis frame 10 wherein one end of one of the side sill members is raised with respect to the other side sill member is effectively accommodated without imposing severe damaging strains on the sheet metal parts of the vehicle cab structure. As an example, if the forward end of the side sill member 11 is suddenly displaced vertically downwardly and simultaneously the forward end of the side sill member 12 is displaced vertically upwardly, the resulting forces are not transmitted to the vehicle cab structure to torsionally distort the same. When this occurs, the side sill members 11 and 12, in effect, pivot in opposite directions in vertical planes about a transversely extending axis 72 disposed in a vertical plane containing the bolts 68 and spaced mid-way between the flanges 73 of the side sill members 11, 12. The axis 72 is also perpendicular to the neutral axis 74 of the chassis frame 10. Because of the spacing of the bolts 68 from the axis 72, such pivoting movement of the side sill members 11, 12 causes the longitudinal axis 75 of the bolt 68 associated with the side sill member 11 to assume the dotted position shown in Figure 5. The longitudinal axis 75 of the other bolt 68 associated with the side sill member 12 is angulated in the opposite direction such that a line extending through the centers of the heads 69 of the bolts would appear as shown by numeral 76 in Figure 1. The line 76 also represents the position of the front cab cross member 61 in plan when the side sill members 11, 12 pivot about axis 72. The relative movement of the sections of the cab cross member 61 disposed within the elements 59 is accommodated by compressing the rubber insulators 64. Thus it will be appreciated that the rear cab cross member 31 must swing about vertical axis 77, which axis 77 is perpendicular to and intersects axes 72 and 74, the same angular amount as the front cab cross member 61 to avoid imposing severe stresses on the vehicle cab sheet metal interconnecting the cab cross members 61, 31. The longitudinal axis designated by numeral 78 assumes the dotted line position shown in Figure 1 and such movement of the rear cab cross member 31 is accommodated by pivoting of the bracket 16 about the pivotal axis of the bolt 18 whereby the shank 28 assumes the position indicated by numeral 79. It will be appreciated that the novel cab connection means described above permit the maintenance of the relationship between the cab cross members 31, 61 regardless of the shocks and strains imposed upon the chassis frame 10, and as a result the sheet metal parts of the cab attached to and interconnecting the cab cross members are not subjected to damaging stresses and strain.

When the side sill members 11 and 12 pivot about axis 72 as described above, the section of the side sill member 11 in the vicinity of the rear cab cross member 31 is displaced vertically upwardly and the section of the side sill member 12 in the vicinity of the rear cab cross member 31 is displaced vertically downwardly whereby a transverse line 80 disposed mid-way between the flanges 73 of side sill members 11 and 12 and perpendicular and intersecting the longitudinal axis of the bolt 18 assumes the dotted line position shown in Figure 3. Consequently the bracket 16 is angulated in a counter-clockwise direction as viewed in Figure 3. The relative vertical swinging of the frame cross member 13 and bracket 16 with respect to the rear cab cross member 31 is accommodated by the ball and socket connection between the bracket 16 and the rear cab cross member 31. From the foregoing it will be obvious that a minimum amount of road shock is transmitted to the cab structure when mounting the vehicle cab as described above, since the damaging forces are effectively dissipated by permitting the vehicle cab to move relatively to the chassis frame in a controlled manner. Once the vehicle has passed over the road bed irregularity the vehicle cab assumes its normal upright and steadied and centered position with respect to the chassis frame.

The embodiment of the invention chosen for the purposes of illustration and description herein is that preferred for achieving the objects of the invention and developing the utility thereof in the most desirable manner, due regard being had to existing factors of economy, simplicity of design and the improvements sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. In a motor vehicle having a longitudinal frame and a body, the combination including said frame and body comprising means for supporting said body upon said frame for relative movement therebetween including means connecting a portion of said body contained within a longitudinally extending vertical plane spaced midway between the sides of said body for universal movement with respect to said frame, said means for connecting said body portion to said frame for universal movement including a ball and socket joint structure, one element of said ball and socket joint structure being carried by said body portion and the other element of said ball and socket joint structure being supported by said frame for swinging movement about a vertical axis perpendicular to the longitudinal median line of said frame and horizontally spaced from said element of said ball and socket joint structure carried by said body portion.

2. In a motor vehicle as set forth in claim 1, in which said means for supporting said body further includes a pair of oppositely disposed connecting means arranged on respective sides of said frame for yieldably resisting universal movement of said body portion with respect to said frame.

3. In a motor vehicle having a longitudinal frame and a body, the combination including said frame and body comprising means for supporting said body upon said frame for relative movement therebetween including single connecting means for securing one end of said body to said frame including a ball and socket structure, one element of said ball and socket structure being carried by said body and the other element thereof being carried by said frame for relative pivotal movement about a vertical axis perpendicular to the longitudinal median line of said frame, said vertical pivotal axis being horizontally spaced from said element of said ball and socket structure carried by said body; and a pair of transversely spaced and aligned connecting means for securing the opposite end of said body to said frame, said connecting means permitting said body to rock vertically about a transversely extending axis and horizontally about a vertical axis perpendicular to said transversely extending axis.

4. In a motor vehicle as set forth in claim 3, in which, said connecting means includes rubber insulators for yieldably resisting rocking movement of said body with respect to said frame.

5. In a motor vehicle having a longitudinal frame and a body, the combination including said body and frame comprising means for supporting said body upon said frame for controlled relative movement therebetween including a single connecting means securing one end of said body to said frame including a bracket mounted on said frame for pivotal movement about a vertical axis, said bracket carrying a semi-spherical bearing spaced from said vertical pivotal axis, said single connecting means further including a ball carried by said body adapted to be seated in said socket; and means for yieldably connecting the opposite end of said body to said frame.

6. In a motor vehicle having a frame comprising a pair of longitudinally extending, transversely spaced side sill members interconnected by a cross member; a vehicle body; means for supporting said body on said frame comprising connecting means securing the rear end of said body to said cross member, said means being spaced substantially midway between said sill members and including a bracket mounted on said cross member for pivotal movement about a vertical axis, said bracket carrying socket means spaced from the vertical pivotal axis, said connecting means further including a ball depending from said body adapted to seat in said socket means, and connecting means for securing the forward end of said body to said frame including a pair of transversely spaced and aligned elastic insulators operatively interconnected between each side sill member and a respective front end portion of said body, said last mentioned connecting means being longitudinally spaced from said single connecting means.

7. A cab mounting for an automotive vehicle having a longitudinal frame including laterally spaced side sill members, a frame cross member connecting said side frame members, and a cab mounted above the frame having a pair of longitudinally spaced transversely extending U-shaped cab cross members on the bottom thereof, means for supporting said cab on said frame comprising a rear mounting connection between the rearwardmost cab cross member and said frame cross member including a bracket pivotally connected to said frame cross member intermediate its ends for horizontal swinging movement about a vertical axis transversely spaced midway between the ends of said frame cross member, said bracket member carrying a semi-spherical bearing means radially spaced from the vertical pivotal axis of said bracket, a shank having an end portion thereof in the form of a ball adapted to be seated in said semi-spherical bearing means, and means for connecting said shank to said rearwardmost cab cross member; front mounting connections between the forwardmost cab cross member and said frame comprising a support member secured to each side frame member, said support members being longitudinally spaced from said rear mounting connection, a U-shaped retainer mounted on each of said support members, a U-shaped rubber insulator seated within each retainer, the inner surface of each insulator being adapted to engage a respective end section of the forwardmost of said cab cross members, and means for clamping said insulators between said forwardmost cab cross member and said retainers.

8. A cab mounting as set forth in claim 7, in which, said shank is capable of moving axially with respect to said rearwardmost cab cross member and said means for connecting said shank to said rearwardmost cab cross member includes resilient means yieldably resisting axial movement of said shank with respect to said rearwardmost cab cross member.

References Cited in the file of this patent

UNITED STATES PATENTS

| | | |
|---|---|---|
| 38,182 | Sherman | Apr. 14, 1863 |
| 1,634,946 | Jupp et al. | July 5, 1927 |
| 1,652,357 | Harper | Dec. 13, 1927 |
| 2,138,114 | Nelson | Nov. 29, 1938 |
| 2,485,794 | Waterbury et al. | Oct. 25, 1949 |
| 2,564,888 | Foley et al. | Aug. 21, 1951 |